US007303821B1

(12) United States Patent
Huang

(10) Patent No.: US 7,303,821 B1
(45) Date of Patent: *Dec. 4, 2007

(54) MATERIAL AND PROCESS FOR PRECISELY CONTROLLED POLYMERIC COATINGS

(75) Inventor: Xueying Huang, Huckessin, DE (US)

(73) Assignee: Sepax Technologies, Inc., Newark, DE (US)

( * ) Notice: Subject to any disclaimer, the term of this patent is extended or adjusted under 35 U.S.C. 154(b) by 231 days.

This patent is subject to a terminal disclaimer.

(21) Appl. No.: 10/887,629

(22) Filed: Jul. 10, 2004

Related U.S. Application Data

(60) Provisional application No. 60/489,786, filed on Jul. 24, 2003.

(51) Int. Cl.
 B32B 9/04 (2006.01)
 B08F 2/00 (2006.01)
 C08F 4/00 (2006.01)
(52) U.S. Cl. .......................... 428/446; 526/81; 526/87; 526/91; 526/109; 526/118; 526/201
(58) Field of Classification Search ................ 428/447, 428/446, 477; 526/81, 87, 91, 109, 118, 526/201
 See application file for complete search history.

(56) References Cited

U.S. PATENT DOCUMENTS

| 5,789,487 | A | * | 8/1998 | Matyjaszewski et al. ... 525/301 |
|---|---|---|---|---|
| 5,792,331 | A | | 8/1998 | Srinivasan |
| 5,807,937 | A | * | 9/1998 | Matyjaszewski et al. ... 526/135 |
| 6,372,353 | B2 | | 4/2002 | Karger |
| 6,653,415 | B1 | * | 11/2003 | Bottcher et al. ............ 526/135 |
| 2002/0103352 | A1 | * | 8/2002 | Sudor ........................ 536/23.1 |
| 2004/0176534 | A1 | * | 9/2004 | Rogers et al. ............. 525/54.3 |

FOREIGN PATENT DOCUMENTS

JP 2004018556 A * 1/2004

OTHER PUBLICATIONS

English translation of JP 2004018556A.*
Liu, Yong, et al, Polymer grafing via ATRP initiated from macroinitiato synthesized on surface, Langmuir, 2004, 20, 6710-6718.*
Kong, Xiangxing, et al, Amphiphilic polymer brushes grown from the silicon surface by atom transfer radical polymerization, Macromolecules, 2001, 34, 1837-1844.*
M. Husseman et al, Macromolecules, 1999, 32, 1424.*
Strege, "Capillary Electrophoretic Protein Separations in Polyacrylamide-Coated Silica Capillaries and Buffers Containing Ionic Surfactants" Journal of Chromatography, 1993, 337-344, 630. Eksevier Science Publishers, Amsterdam.
Wan, "Bonded Dimethylacrylanides as a Permanent Coating for Capillary Electrophoresis" Journal of Chromatography, 2001, 59-70, 924, Elsevier Science Publishers. Amsterdam.
Cobb, "Electrophoretic Separations of Proteins in Capillaries With Hydrolytically Stable Surface Structures" Anal. Chem. 1990, 2478-2483 62. American Chemical Society.
Hjerten "High Performance Electrophoresis, Elimination of Eletroendosmosis and Solute Adsorption" Journal of Chromatography, 1985, 191-198, 347, Elsevier Science Publishers, Amsterdam.
Chiari "Synthesis and Characterization of Capillary Columns Coated With Glycoside—Bearing Polymer" Anal. Chem. 1996. 2731-2736. 68 American Chemical Society.
Dolink "DNA Sequencing by Capillary Electrophoresis" J. Biochem. Biophys. Methods 1999, 103-119, 41. Elsevier Science Publishers. Amsterdam.
Huang "Surface-Confined Living Radical Polymerization for Coating in Capillary Electrophoresis." Anal. Chem. 1998, 4023-4029. 70. American Chemical Society.
Deqing Xiao and Mary J. Wirth "Kinetics of Surface-Initiated Atom Transfer Radical Polymerization of Acrylamide on Silica" Macromolecules 2002, 35, 2919-2925.
Mircea Tesdorescu and Krzysztof Matyjaszewski ATOM Transfer Radical Polymerization of (Meth)acrylamides Macromolecules 1999, 32, 4826-4831.
X. Huang and M. J. Wirth "Surface Initiation of Living Radical Polymerization for Growth of Tethered Chains of Low Polydispersity" Macromolecules 1999, 32, 1694-1696.

* cited by examiner

*Primary Examiner*—Randy Gulakowski
*Assistant Examiner*—A. Toscano

(57) ABSTRACT

This invention provides a chemically coated surface for the electrophoretic separation application. The surface comprises of block copolymers prepared from addition monomers selected from a group consisting of acrylates and its derivatives, metharylates and its derivatives, styrene and its derivatives, acrylamide, methacrylamide, dimethacrylamide, N-monosubstituted acrylamide, N-monosubstituted methacrylamide, N,N-bissubstituted acrylamide, N,N-bissubstituted methacrylamide, vinyl acetate, vinyl pyrolidone, vinyl ether, acrylic acid and methacrylic acid. This invention also provides a chemical process for making the chemically coated surface for the electrophoretic separation application. The process comprises:

(a) contacting the support surface with a coupling agent solution, then
(b) contacting the support surface with a first living radical polymerizing solution, and optionally
(c) contacting the support surface with a second living radical polymerizing solution.

26 Claims, 2 Drawing Sheets

MATERIAL AND PROCESS FOR PRECISELY CONTROLLED POLYMERIC COATINGS

CROSS REFERENCE TO RELATED APPLICATION

This application is related to and incorporates by reference the U.S. Provisional Application No. 60/489,786, which was filed on Jul. 24, 2003. This application claims the priority filing date of the U.S. Provisional Application No. 60/489,786, which was filed on Jul. 24, 2003.

FIELD OF THE INVENTION

The present invention relates to polymeric coating on the surface of capillary columns and microchannel for electrophoretic separation applications. In particular, the present invention involves capillary columns and microchannel having a uniform thin coating on the interior wall to reduce non-specific interaction between analyte and interior surface. The invention also relates to the process of making such uniform thin coatings on the inner surface of the capillary columns and microchannel.

BACKGROUND OF THE INVENTION

Capillary electrophoresis (CE) has developed into a powerful analytical method due to its high resolution and low volume requirement. Providing fast and efficient separations, CE offers significant advantages over conventional slab gel electrophoresis. However, a major problem encountered in CE application is the interaction of analytes, such as proteins, with exposed surface silanol groups on the capillary wall. This interaction results in a loss of efficiency and irreproducible binding. The electrophoretic mobility of analyte in CE is a constant value depending on the analyte's characteristics, buffer composition and temperature. A second mode for the analyte motion is driven by electroosmotic flow (EOF) which originates from the negatively charged silica capillary surface. The apparent mobility of an analyte is determined by the combined electrophoretic mobility and the EOF. Due to the variation of EOF from run-to-run and the non-specific interaction of the analyte with the inner surface of the capillary, it is very difficult to achieve reproducible separations. A number of CE applications, such as protein separations, DNA sequencing and peptide mapping, require reproducible separation, such as consistent retention time and high efficiency, as well as minimum non-specific bindings. Therefore a solution for suppressing EOF and minimizing non-specific interactions is very important for CE's utilities.

Surface coating is a natural step for controlling EOF and the non-specific interactions. In the past decade, several different methods have been developed to coat the capillary inner wall surface. Typical ones include physically adsorbed coating, i.e. dynamic coating, and chemical bonded coating, i.e. permanent coating. A number of different dynamic coatings produced by adsorption of polymers from an aqueous solution have been described. (Madabhushi, Electrophoresis, 19, 224, 1998; Chiari, et al. J. Chromatogr. A 817, 15, 1998; Gilges, et al. J. High Resolution Chromatography 15, 452, 1992). Whereas, a common problem of these coatings is that the polymers can be easily removed from the capillary wall simply by washing with water or buffer solution. Therefore, unless otherwise stabilized, these coating are useful in reducing EOF only when a small amount of polymer is dissolved in the running buffer and can replace the polymer removed by running buffer from the surface. U.S. Pat. No. 6,410,668 (Chiari et al. "Robust Polymer Coatings") described another example of dynamic coating for improvement of separation by using uncharged water-soluble polymers that could reduce EOF in capillary electrophoresis temporally without addition of any polymer to the running buffer. The polymer coating was achieved by a thermal treatment of an immobilized PVA on the capillary wall. This coated capillary gave a low EOF up to pH 9. However, only 40 runs were possible at pH 8.5 without loss of efficiency. Overall, dynamic coatings are physically attached to the capillary surface and can be easily removed. The detached polymer will contaminate the analyte. Moreover, the dynamic coating is a very thin polymer layer, usually less than 1 nm in thickness. It is not effective in reducing non-specific interaction with charged molecules, especially proteins.

A chemical bonded coating is, in general, more stable than a physically adsorbed coating. Several articles have summarized chemically modified capillaries that were designed to minimize the presence of surface silanols and reduce analyte interactions (Dolnik et al. J. Biochem. Biophys. Methods 1999, 41, 103-119; Chiari et al. Anal. Chem. 1996, 68, 2731). These modifications involve attaching or creating a polymeric layer on the surface of the capillary through various coupling chemistries. Hjerten (J. Chromatogr. 347, 191, 1985) showed a two-step coating process by attaching a bifunctional silane on the surface of the capillary followed by in situ free radical polymerization of a vinyl group containing monomer, e.g. acrylamide. The presence of a polymerizable C=C group was essential in both the monomer and silane for coupling. Cobb et al. (Anal. Chem. 1990, 62, 2478) used Grignard reaction to link a vinyl group (—CH=CH$_2$) directly to the capillary surface, followed by the same free radical polymerization of acrylamide as Hjerten method. U.S. Pat. No. 6,372,353 (Karger et al. "Coated surface composing a polyvinyl alcohol (PVA) based covalently bonded stable hydrophilic coating") disclosed a PVA coating by free radical polymerization of vinyl acetate, followed by hydrolysis. U.S. Pat. No. 5,792,331 (Srinivasan et al. "Perform polymer coating process and product") described a coating method for covalently bonding a coupling agent having capability of forming a free radical under hydrogen abstraction conditions and then contacting with polymers at elevated temperature to form a coating layer on the surface. Strege et al (J. Chromatography 665, 63, 1993) reported in-situ cross-linking polymerization of polyacrylamide on capillary surface for separation of basic proteins with no added cationic additives in the buffer. Recently, Wan et al (J. Chromatography A 924, 59, 2001) reported polymerization of dimethylacrylamide at low concentration in the presence of isopropyl alcohol to achieve high separation efficiency. All above methods utilized free radical polymerization. For free radical polymerization, the radicals are formed in the solution as well as on the surface. With majority of the polymers formed in the solution, this coating method results in no control of polymer molecular structure, coating uniformity and thickness. These important properties have great influence on the EOF and non-specific interactions. A big disadvantage of using this method is that the free polymer could precipitate from the solution, which may block micro-channel of capillary, or the polymer chains formed in the solution could cross-link the capillary walls to clog the capillary. Such an uncontrolled process makes the coating irreproducible, and introducing variations in separations. It makes production difficult. There are strong interest and need in industry and academia for making stable, reproducible and uniform polymeric coatings on the inner wall of the silica capillary by a simpler method. For example, multiple capillary array technology, which needs to handle 96 or more capillaries at the same time, requires simple and reliable coating procedures. With a controlled process to make a polymer coating, various polymeric structures of the coatings can be manipulated to achieve better separation results. Moreover, the polymer coated support surfaces can be used for separating the components in a fluid stream such as micro-channel separation or liquid chromatography.

SUMMARY OF THE INVENTION

The present invention provides a uniform thin coating comprising of novel block copolymers on the interior wall of the microchannel and capillary columns for the electrophoretic separation application. The coating suppresses electroosmotic flow in capillary electrophoresis and reduces non-specific interactions for protein separations. The block copolymer comprises of the addition monomers selected from a group consisting of acrylates and its derivatives, metharylates and its derivatives, styrene and its derivatives, acrylamide, methacrylamide, N-monosubstituted acrylamide, N-monosubstituted methacrylamide, N,N-bissubstituted acrylamide, N,N-bissubstituted methacrylamide, vinyl acetate, vinyl pyrolidone, vinyl ether, acrylic acid, methacrylic acid, etc. Preferred addition monomers are polyethylene glycol methacrylate with $(CH_2CH_2O)_n$, n=1–20, polyethylene glycol acrylate with $(CH_2CH_2O)_n$, n=1–20, glycidyl methacrylate, glycidyl acrylate, acrylamide, methacrylamide, dimethylacrylamide, vinyl pyrolidone. Most preferred addition monomers are polyethylene glycol methacrylate with $(CH_2CH_2O)_n$, n=1–20, polyethylene glycol acrylate with $(CH_2CH_2O)_n$, n=1–20, acrylamide, methacrylamide.

The present invention also provides a chemical process for making the chemically coated surface for the electrophoretic separation application. The process comprises:

(a) contacting the support surface with a coupling agent solution, then (b) contacting the support surface with a first living radical polymerizing solution, and optionally (c) contacting the support surface with a second living radical polymerizing solution.

BRIEF DESCRIPTION OF THE FIGURES

The FIG. 1 is an electrophoretic separation diagram of proteins (0.5 mg/mL in 50 mM acetate buffer, pH 4.5): (1) lysozyme and (2) cytochrome C with polyacrylamide coated capillary, 50×42 cm, 75 µm, made by the method described in Example 6. The separation media was 50 mM acetate buffer, pH 4.5. Applied voltage was 20 kV and the current generated was 96 µA. The detection wavelength was 214 nm.

The FIG. 2 is an electrophoretic separation diagram of proteins (1 mg/mL in 50 mM acetate buffer, pH 4.5): (1) lysozyme; (2) cytochrome C and (3) ribonuclease A with PEGM polymer coated capillary, 50×42 cm, 75 µm, made by the method described in Example 7. The separation media was 50 mM acetate buffer, pH 4.5. Applied voltage was 20 kV and the current generated was 96 µA. The detection wavelength was 214 nm.

DETAIL DESCRIPTION OF THE INVENTION

Figure 1:
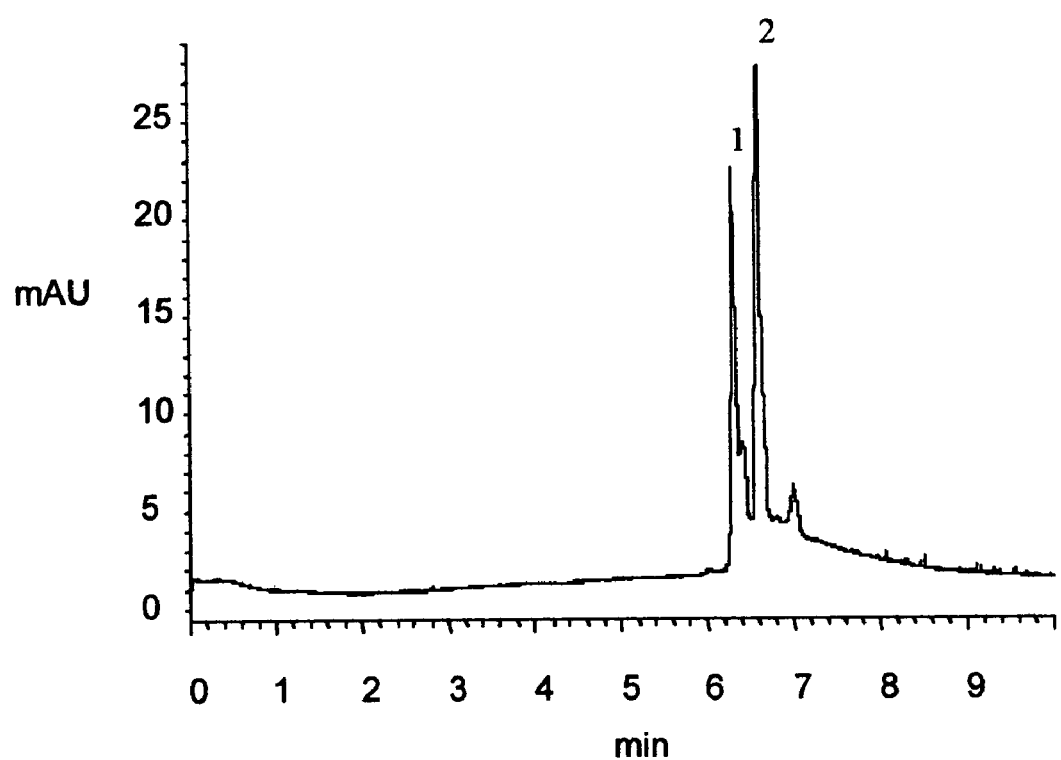

This invention is intent to provide a chemically coated surface for chemical and biological separations in CE, micro-chip and HPLC, etc. The chemically coated surface comprises of a support surface, a coupling agent and a chemical surface coating comprising at least one block copolymer prepared from addition monomers. The coupling agents attach onto the support surface and provide initiators for forming the chemical surface coating utilizing living radical polymerization reactions that are described in the reference (Matyjaszewski, etc. Chem. Rev. 2001, 101, 2921).

A support surface in this invention means a solid surface on which a coupling agent is attached via covalent bonding or non-covalent binding. For the support surface suitable for chemical bonding, one embodiment is silica which contains hydroxyl groups on the surface. Other suitable support surfaces which contain hydroxyl groups, or groups convertible to hydroxyl groups, include silicon, titania, quartz, glass, alumina, zirconia, rubber, metal oxide, plastics, etc. Besides, support surfaces can be any solid surfaces containing functional groups that can form covalent bonds with a coupling agent. These functional groups include, but are not limited to OH, COOH, CHO, Br, Cl, $NH_2$, $NHR_1$, etc. wherein $R_1$ is hydrocarbyl or substituted hydrocarbyl. In some situations, the support surface needs to be treated to generate adequate functional groups. One embodiment is that plastic surface of microchannel need to be treated with ozone to generate hydroxyl groups (Genzer, et al, Science 2000, 290, 2130).

For the support surface suitable for non-covalent binding, one embodiment is a plastics which has hydrophobic surface as described in U.S. Pat. No. 5,621,018 (Chabrecek et al, "Functionalized photoinitiators, macromers thereof, and the use thereof").

In this invention, a coupling agent plays a role of a platform on which a living radical polymerization can be conducted. Two types of coupling agents are disclosed here. One is a small bifunctional organic molecule which, at one end, can form covalent bond with functional groups on the support surface, and at the other end, can generate a "living" radical for initiating polymerization of addition monomers. "Living" radical means a chain radical that has negligible chain transfer or termination reactions in the process of polymerization. A generic structure of a coupling agent is as following:

Z—L—Y

Z is a functional group capable of forming a covalent bond with a functional group on the support surface. Z can include, but are not limited to OH, COOH, CHO, Br, Cl, $NH_2$, $NHR_1$ wherein $R_1$ is hydrocarbyl or substituted hydrocarbyl.

L is a divalent organic moiety.

Y is a functional group capable of generating a living radical for initiating polymerization of addition monomers.

A preferred coupling agent is as following:

Q is a functional group capable of forming a covalent bond with a functional group on the support surface, n=3, 2, or 1, B is hydrocarbyl or substituted hydrocarbyl, L is a divalent organic moiety, Y is a functional group capable of generating a "living" radical for initiating polymerization of addition monomers.

Support surface can have various functional groups on the surface, such as OH, COOH, CHO, Br, Cl, $NH_2$, $NHR_1$ ($R_1$ is hydrocarbyl or substituted hydrocarbyl). Q is a functional group which can react with the corresponding surface functional group to form covalent bond. For example, if the surface function group is COOH, Q is OH or halogen. For the support surface with hydroxyl groups, preferred Q is selected from a group consisting of alkoxy, halogen or other hydrolyzable groups. Most preferred Q is selected from a group consisting of alkoxy, Cl and Br.

Silica surface, such as inner wall of capillary or microchannel, has hydroxyl groups. Before reaction with the coupling agent, the silica surface is washed with base such as dilute NaOH, or KOH aqueous solution and then acid such as diluted HCl, $HNO_3$ and water to generate maximum number of free hydroxyl groups. After drying, the surface is reacted with the coupling agent by contacting a solution of the coupling agent in organic solvents such as toluene, THF, ether and dioxane. Coupling reaction can be done with or without catalysts. Where Q is alkoxy, acid or base can be used as a catalyst. Where Q is a halogen, it is unnecessary to use a base catalyst but the bases such as triethylamine and pyridine etc. can help the coupling reaction. The coupling reaction or self-assembling may need heat to expedite the reaction. The temperature range is from room temperature to up to 150° C.

In this invention, the functional group Y acts as a "living" radical initiator. The Y group can be halo-esters, halo-amides, halo-sulfones, halo-ketones, halo-benzyls and halo-allyl (halo=Cl, Br, I) with a general formula as shown below:

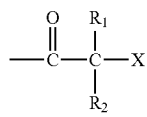

Wherein $R_1$, $R_2$ are independently selected from a group consisting of H, hydrocarbyl and substituted hydrocarbyl. X is selected from Cl, Br and I. Preferred is $R^1$=$R_2$=$CH_3$, X is Cl or Br.

Alternatively, Y can be a benzyl halogen with a general formula as shown below:

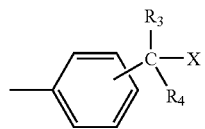

Wherein $R_3$, $R_4$ are independently selected from a group consisting of H, hydrocarbyl and substituted hydrocarbyl. X is selected from Cl, Br and I. Preferred is $R_3$=$R_4$=$CH_3$, X is Cl or Br.

The Y group can also be cyclic nitroxides such as 2,2,6, 6-tetramethylpiperidinyl-1-oxy (TEMPO) or substituted TEMPO, dithiocarbamates such as RC(=S)S—. The "living" radical can be generated by metal complex catalysts or heating or light irradiation.

The other type of coupling agent can be a polymer or an oligomer that has two functional segments: one providing a binding with the support surface and the other providing an initiation species for "living" radical polymerization. Preferred polymer or oligomer backbone is a hydrocarbon chain. The binding domain with the support surface can be backbone or side chain. The binding can be achieved by hydrophobic interaction, hydrophilic interaction, electrostatic interaction or chemical bonds. For example, silica surface is negatively charged at pH higher than 3, a random copolymer shown below (2) can be attached to the silica surface via electrostatic interaction. Multiple binding sites of a polymeric coupling agent make the coating stable on the surface.

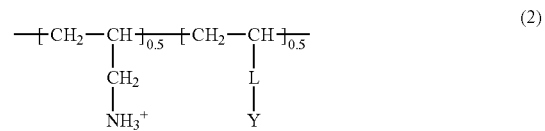

The binding functional groups on the polymeric or oligomeric coupling agent can also be functional groups that can form covalent bonds with the support surface. Such functional groups can be OH, COOH, CHO, Br, Cl, $NH_2$, $NHR_{1 (R^1}$ is hydrocarbyl or substituted hydrocarbyl). A random copolymer coupling agent of this kind is shown below:

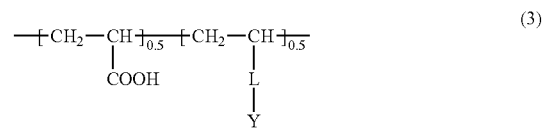

In structures 2 and 3, L and Y are the same functional groups as in structure 1, i.e. L is a divalent organic moiety, Y is a functional group capable of generating a "living" radical for initiating polymerization of addition monomers.

After covalently bonding or physically binding the coupling agent on the support surface, in this invention, a chemical surface coating is achieved by a "living" radical polymerization. The process involves contacting a living radical polymerizing solution with the coupling agent attached support surface. In this invention, a living radical polymerizing solution comprises of at least one solvent, at least one catalyst and at least one addition monomer.

The polymerization can be conducted in aqueous or organic solutions. If the addition monomer is soluble in water, aqueous solution is the most preferred because water is a safe solvent and can reduce the cost. If the addition monomer is insoluble in water, in some case, aqueous solution can still be used under the help of suitable surfactant. Another preferred solvent system is a mixture of water and a water miscible organic solvent. The polymerization can be conducted in most organic solvents and their mixtures as well, e.g. methanol, ethanol, acetone, isopropanol, DMF, DMAC, THF, dioxane, DMSO, toluene, benzene, chlorobenzene, trifluorotoluene, acetonitrile, etc.

Catalysts used in this invention are metal complex $MX_nE_m$ (M=Cu, Ni, Ru, Rh, Re or Pd; E is a ligand, such as, bipyridine and its derivatives, $Ph_3P$ and polyamine; X is Cl, Br or I; n=1 to 6, m=1 to 6). Polyamine herein means a molecule with at least two amine groups. Preferred catalysts are $CuX_nE_m$, wherein X is Cl or Br, E is selected from bipyridine and its derivatives, n=1 or 2, m=2. The most preferred catalysts are $CuCl(bipyridine)_2$ and $CuCl_2(bipyridine)_2$. In order to grow a controlled polymer on the support surface, it is crucial to add both $CuX(bipyridine)_2$ and $CuX_2(bipyridine)_2$ catalysts into the living radical polymerizing solution with certain molar ratio (e.g. $[CuX(bipyridine)_2]/[CuX_2(bipyridine)_2]=5$). The presence of both $CuX(bipyridine)_2$ and $CuX_2(bipyridine)_2$ enables generation of confined radicals on the surface that make the polymerization happens only on the surface in a workable speed.

Addition monomers used in this invention are selected from a group consisting of acrylates and its derivatives, metharylates and its derivatives, styrene and its derivatives, acrylamide, methacrylamide, N-monosubstituted acrylamide, N-monosubstituted methacrylamide, N,N-bissubstituted acrylamide, N,N-bissubstituted methacrylamide, vinyl acetate, vinyl pyrolidone, vinyl ether, acrylic acid, methacrylic acid. Preferred addition monomers are selected from a group consisting of polyethylene glycol methacrylate with $(CH_2CH_2O)_n$, n=1–20, polyethylene glycol acrylate with $(CH_2CH_2O)_n$, n=1–20, glycidyl methacrylate, glycidyl acrylate, acrylamide, methacrylamide and vinyl pyrolidone. Most preferred monomers are selected from a group consisting of polyethylene glycol methacrylate with $(CH_2CH_2O)_n$, n=1–20, polyethylene glycol acrylate with $(CH_2CH_2O)_n$, n=1–20, acrylamide, methacrylamide, etc.

Reaction between the living radical polymerizing solution and the coupling agent on the support surface generates polymer chains from the surface to give covalently attached polymer brushes with high graft density and controlled molecular weight. Polymerization proceeds at 0° C. to 150° C., preferred is at 20 to 80° C. and the most preferred is at room temperature. The thickness of the chemical surface coating here is controlled by polymerization time and concentration of the monomer and the catalyst. The molecular structure of the coating is determined by the structure of the monomers and polymerization process. When a mixture of two or more monomers is added at the same time, a random copolymer coating layer is formed. When a crosslinking agent e.g. a diene is added, a crosslinked polymer coating is produced.

In order to increase stability of the coatings, a suitable crosslinking agent may be used together with addition monomers for the polymerization. The crosslinking agent is usually di, tri and tetra-functional molecules. The commonly used crosslinking agents in this invention are the di, tri and tetra olefins. Preferred crosslinking agents are selected from divinylbenzene, N,N'-methylenebisacrylamide, triallylamine, ethyleneglycoldiacrylate, tetraethyleneglycoldiacrylate, 1,1,1-trimethylolpropanetriacylate and tetraallyloxyethane.

This invention also provides a block copolymer coating on the support surface. Chemical surface coating formed by block copolymers are very useful for the separation technology because of their ability to tune the surface properties, conduct phase separate and self-assemble into spherical, rodlike, and lamellar geometries. For example, if one block of the coating is hydrophilic and the other one is hydrophobic, these two different polarities can be utilized for different applications. Hydrophobic part can increase the stability when the hydrophilic part is to create biocompatibility. When grown on surfaces, the copolymer orientation of the phase-segregated structure can be controlled by the application of external fields. These phenomena lead to formation of patterns that can be used as templates for further useful materials. Tethering multiblock copolymers bonded to surfaces is particularly interesting because it provides responsive, controllable interfaces with nanoscale features. The topology of multiblock copolymer also suggests their use in forming multilayered materials where the layers can be arranged in a predetermined order. Growth of such films from tethered initiators complements other layer-by-layer schemes for thin film coatings (Winterton et al, "Single dip process for achieving a layer-by-layer-like coating", US patent 2001/0048975A1). The block copolymer or patterned coating on inner wall of capillary or micro-channel has special properties for separation of biomolecules.

The invention is particularly powerful for the preparation of surface-tethered block copolymers because the "living" polymer chain radical is confined to the surface. After one polymer chain is formed on the surface, the end group of the polymer chain is still an initiator that can be initiated again to graft another polymer. Therefore, block copolymers can be prepared by the sequential activation of the dormant chain end in the presence of different monomers. Besides, the length of the copolymer chain is controlled by the elapsed polymerization time of each steps of the polymerization. After rinsing to remove residual catalyst and monomer, the polymerization can be reinitiated to extend the chains, or multiblock copolymers can be synthesized by simply switching to a different monomer after each cycle. Therefore, synthesizing surface-tethered block copolymers can be achieved by the sequential addition of two or more monomers during polymerization from a surface. Specific examples include, but not limit to: polyacrylamide-b-poly(hydroxyethyl acrylate), polyacrylamide-b-poly(polyethylene glycol acrylate), polycrylamide-b-poly(sugar acrylates), polyacrylamide-b-poly(glycide acrylate), etc.

A specific feature of this invention is that the end groups of the polymer chains on the surface in this invention contain halogens. In addition, the monomer may have certain functional groups, leading to a polymer chain formed with certain functional groups, such as hydroxyl group. Both of those functional groups can be converted to various functional groups to tune the chemical and physical properties of the polymer coating.

This invention has following advantages. 1) The polymers are only formed on the surface. The free polymer formed in the solution is negligible. 2) The polymer film thickness can be very well controlled. 3) The density of initiator at the surface can be easily controlled by adding a second non-polymerizable coupling agent in the monolayer formation step, thus forming a controlled polymer chain density. 4) Polymer chains can be readily functionized for various applications. 5) The surface polymerization can proceed in aqueous media at room temperature. In contrast, the use of traditional free radical polymerization method precludes the polymerization only formed on the surface, or control of polymer film thickness, or formation of block copolymer brushes. For very small micro-meter size channels, it is not practical or feasible for the traditional free radical polymerization to coat the surface, simply because the free polymer formed in the solution clogs the narrow channel. A precision control of the polymer structure on the surface provides a solution for coating very narrow capillaries (0.5 μm to 200 μm) and micro-channels. The controlled nature of the polymerization process also permits structural characteristics (MW, PD, branching, etc.) of the polymer brush to be readily varied. After the polymer chains are formed on the surface, the chain end groups are still initiators that can be initiated again to graft another polymer. An added benefit is the ability to prepare block copolymers by the sequential activation of the dormant chain end in the presence of different monomers. In this invention we detail the use of surface bound initiators and "living" radical procedures for the preparation of a wide range of polymeric brushes with accurate control over the chain structure in the inner wall of the capillary or the micro-channel surface.

The capillary or micro-channel coated by the invention satisfies three major requirements for CE separation: (1) provide reproducible migration of analytes by suppressing EOF or keep a reproducible EOF; (2) minimize analyte interaction with the capillary surface through a coating of a defined polarity and thickness to shield silanol effect, thus maximizing separation efficiency and recovery, (3) retain stability of the coating over wide range of pH (e.g. from 2 to 9) of the buffer.

EXPERIMENTAL

The present invention is further defined in the following Examples. It should be understood that these Examples are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

The following materials were purchased from Aldrich Chemical Co., P.O. Box 2060, Milwaukee, Wis., 53201:
Acrylamide, 99+% electrophoresis grade
Polyethylene glycol methacrylate (Average MW 360)
Bipyridine, 99.9+%
Copper(1) chloride (CuCl), 99.9+%
Copper(II) chloride ($CUCl_2$), 99.9+%
5-hexen-1-ol
Triethylamine
$HSi(OCH_2CH_3)_3$
$Cp_2PtCl_2$
2-bromo-2-methylpropionyl bromide
Sodium hydroxide
Hydrochloric acid
Toluene
Other organic solvents such as acetone, methanol, ethanol, THF, methylene chloride are also from Aldrich.

Example 1

Synthesis of Pent-4-enyl-2-bromo-2-methyl propionate Precursor

With continuous stirring, 146 mL of 5-hexen-1-ol (3.0 mol) and 10 mL of triethylamine (60.0 mmol) were added at 0° C. and under a nitrogen gas atmosphere to a 1000 mL round bottom flask containing 150 mL of dry $CH_2Cl_2$. 827 mL of 2-bromo-2-methylpropionyl bromide (3.0 mol) was added dropwise over 60 min to form a white triethylamine salt. The resulting solution was then stirred for 1 hour at 0° C. The solution was warmed to room temperature over the next 5 hours, and became dark brown in color. The precipitate was filtered off and rinsed with 500 mL methylene chloride. The filtrate was extracted 4 times with 250 mL/each of saturated aqueous ammonium hydroxide ($NH_4Cl$) and 4 times with 250 mL/each $H_2O$. The crude brown oil was characterized and used in the next step of synthesis. $^1HNMR$ ($CDCl_3$, δ in ppm): 5.9-6.0 (m, 1H), 5.1-5.2 (d, 2H), 4.3 (m, 2H), 2.2 (m, 2H), 2.1 (s, 6H), 1.8 (m, 2H), 1.6 (m, 2H). Mass Spectrum (Cl): m/z 248.

Example 2

Preparation of 5-Trichlorosilyl pentyl 2-bromo-2-methyl propionate Initiator

In a 500 mL flask equipped with a nitrogen purge, 190 g of pent-4'-enyl-2-bromo-2-methyl propionate and 125 mg $H_2PtCl_6$ in 1.0 g of isopropanol alcohol were mixed. 160 g of $HSiCl_3$ was added at room temperature dropwise. The reaction is exothermic. Stirred the mixture overnight at room temperature. All volatiles were evaporated in full vacuum. $^1H$ NMR ($CDCl_3$, δ in ppm): 4.104.13 (t, 2H), 3.75-3.79 (q, 6H), 1.89 (s, 6H), 1.64 (m, 2H), 1.35, (m, 6H), 1.17-1.21 (t, 9H), 0.59 (m, 2H). MS (Cl): m/z 430 ($M+NH_4$), 412 (M+H), 384 ($M-C_2H_5$), 367 ($M-C_2H_5O$), 287, 245, 180.

Example 3

Self-Assembling Initiator Monolayer on Microchip Substrate

Step 1: Microchip Surface Clean-Up

The glass cover slides and silicon wafer (cut into pieces of 24×30 $mm^2$ or 20×15 $mm^2$) were treated with piranha solution (70% $H_2SO_4$+30% $H_2O_2$ (30% concentrate)) in a beaker for 30 min at 70° C. The cover slides and wafers were then rinsed thoroughly with the Barnstead Nano-pure water (18.2 MΩ-cm), and dried in oven at 120° C. for 1 h.

The piranha solution should be handled with extreme caution, as it tends to violently react with most organic materials. There should not be organic materials present in the area where the piranha solution is being used. The operator handling the piranha solution should be equipped with double safety gloves, for example, nitrile and neoprene, and should exercise any additional safety precautions that are warranted.

Step 2: Self-Assembling a 0.15% Solution of Initiator Molecules as a Monolayer

In preparing 150 mL of 0.15% 5-trichlorosilyl pentyl 2-bromo-2-methyl propionate, 0.225 mL of the 5-trichlorosilyl pentyl 2-bromo-2-methyl propionate prepared in accordance with example 2 was added to 150 mL anhydrous toluene, and stirred for 5 minutes. The solution was then transferred to a shallow beaker loaded with 10 pieces of clean cover slides and 10 pieces of silicon wafers (15×20 $mm^2$ or 24×30 $mm^2$). The beaker was covered with aluminum foil and set on the bench for 1 hour at room temperature. The reacted wafers were then rinsed with toluene and acetone, and baked in an oven at 110° C. for 1 hour. After baking, the film thickness of the assembled initiator monolayer was measured with an ellipsometer and determined to be 10.3 Å.

Example 4

Preparation of Polymer Coupling Agent

Step 1: Synthesis of Initiator Monomer:

The initiator monomer as shown below is synthesized by coupling 2-hydroxylethyl methacrylate with 2-bromo-2-methylpropionic acid. In a 100 mL round bottom flask is added 6.5 g (0.05 mol) of 2-hydroxylethyl methacrylate, 8.35 g of 2-bromo-2-methylpropionic acid, 12.7 g of 1,3-dicyclohexylcarbodiimide (DCC) (0.06 mol) and 50 mL anhydrous THF. The mixture is stirred for 2 minutes at room temperature. Then 50 μL of triethylamine is added to the above solution. After the reaction is proceeded at room temperature for 12 hours, the reaction mixture is filtered to remove

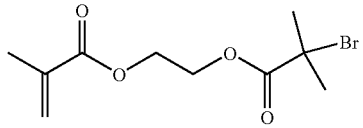

1,3-dicyclohexylurea (DCU). The solvent and the unreacted agents are removed by evaporation under vacuum to yield the product:

Step 2: Synthesis of Polymer Coupling Agent

In a flask is added 8.6 g of acrylic acid (0.1 mol), 27.9 g of the initiator monomer from step 1 (0.1 mol), 0.328 g of 2,2'-Azobisisobutyronitrile (AIBN) (0.002 mol) and 100 mL of THF. The mixture is sealed with a rubber septum and flushed with $N_2$ for 10 minutes, then put into an oil bath at 65° C. After the reaction is stirred at 65° C. for 12 hours, the product is purified by precipitating in methanol and then dried under vacuum at 50° C. overnight.

Step 3: Attachment of the Polymer Coupling Agent to Silica Surface:

By mixing 0.1 g of polymer coupling agent from step 2, 0.15 g of 1,3-dicyclohexylcarbodiimide (DCC) in 2 g of THF, a 5 wt % polymer coupling agent solution is prepared. 20 μL of triethylamine is added into the mixture. The solution is then pumped into the capillary by $N_2$ pressure. After 3 drops of the initiator solution come out of the other end of the capillary, both ends of the capillary are sealed with a silicon rubber septum. The reaction is allowed to proceed for 12.0 hour at room temperature. The capillary is then rinsed with acetone for 1.0 hour.

Example 5

Growing a Polyacrylamide (PAAm) Film on the Surface of a Microchip Substrate

In a typical reaction, an acrylamide monomer mixture having a 7.0 M concentration was prepared by adding 20.0 g of acrylamide (MW 71) and 20.0 g of nanopure water to a 100 mL round bottom flask. Then, 1.97 g of bipyridyl (MW 154), 0.114 mg of $CuCl_2$ (MW 134.5) and 0.417 mg CuCl (MW 99) were added to the flask. The flask was immediately sealed with a rubber septum and the mixture was stirred at room temperature for 10 min under a nitrogen atmosphere. 5 ml of said mixture was transferred by syringe to a flask charged with an initiator monolayer bonded wafer or cover slide prepared in Example 3. The flask containing the wafer was flushed with $N_2$ for 5 minutes and then sealed with a rubber stopper before charging of the chemicals, The reaction was allowed to continue at room temperature for 4 hours. Thereafter, the wafer was rinsed with nanopure water and air-dried. The thickness of PAAm was measured as 28.3 nm by the ellipsometer.

Example 6

Controlled Surface Polymerization to Coat a Layer of Polyethylene Glycol Methacrylate (PEGM) on a Microchip Substrate The clean-up and initiation monolayer steps are the same as those in Example 3. In a typical polymerization reaction, an ethylene glycol methacrylate monomer solution having a 1.5 M concentration was prepared by adding 4.0 g of ethylene glycol methacrylate (MW 360) and 3.6 g of nanopure water to a 20 mL sample vial. Then, 0.0452 g of bipyridyl (MW 154), 0.0036 mg of $CUCl_2$ (MW 134.5) and 0.0134 mg CuCl (MW 99) were added to the vial. The vial was immediately sealed with a rubber septum and the mixture was stirred at room temperature for 10 min under a nitrogen atmosphere. 5 ml of said mixture was transferred by syringe to a flask charged with an initiator monolayer bonded wafer or cover slide prepared in Example 3. The flask containing the wafer was flushed with $N_2$ for 5 minutes and then sealed with a rubber stopper before charging of the chemicals. The reaction was allowed to proceed for a period of time ranging from 5 minutes to 72 hours at room temperature depending on the film thickness desired. Then the microchip was rinsed with nanopure water. Subsequently, the thickness of the PEGM thin film was measured by an ellipsometer. (see Table 1 contained herein below). For each of the measurements, the relative standard deviation (% RSD) is less than 3% indicating that the film surface is very uniform.

TABLE 1

PEGM Film Growth in Correlation to Polymerization Reaction Time.

| T (hours) | Thickness (Å) |
|---|---|
| 0.5 | 80 ± 2 |
| 1 | 130 ± 5 |
| 2.5 | 213 ± 10 |
| 4 | 300 ± 12 |
| 6 | 380 ± 13 |
| 8 | 450 ± 15 |

Example 7

Controlled Surface Polymerization to Coat a Polyacrylamide (PAAm) Thin Film on Capillary Inner Wall Surface Step 1: Capillary Inner Wall Surface Clean-Up A 2-m section of bare silica capillary (75 μm ID, 360 μm OD from SGE) was rinsed with a flowing solution of 1.0M KOH aqueous solution for 1.0 h at room temperature and then rinsed with the Barnstead Nano-pure water (18.2 MΩ-cm) for 3.0 hours, and dried by flowing $N_2$ through for 3.0 h at room temperature.

Step 2: Self-Assembling an Initiator Monolayer on the Capillary Surface

In preparing 15 mL of 0.15% 5-trichlorosilyl pentyl 2-bromo-2-methyl propionate, 22.5 μL of the 5-trichlorosilyl pentyl 2-bromo-2-methyl propionate prepared in accordance with example 2 was added to 15.0 mL anhydrous toluene, and stirred for 5 minutes. The solution was then pumped into the capillary by $N_2$ pressure. After 3 drops of the initiator solution came out of the other end of the capillary, both ends of the capillary were sealed with a silicon rubber septum. The reaction was allowed to proceed for 1.0 hour at room temperature. The capillary was then rinsed with acetone for 1.0 hour. Finally the capillary was baked in an oven at 110° C. for 1.0 h.

Step 3. Growing a Polyacrylamide (PAAm) Film on the Capillary Inner Wall Surface In a typical reaction, an acrylamide monomer mixture having a 7.0 M concentration was prepared by adding 2.0 g of acrylamide (MW 71) and 2.0 g of nanopure water to a 20 mL sample vial. Then, 0.197 g of bipyridyl (MW 154), 0.0114 mg of $CuCl_2$ (MW 134.5) and 0.0417 mg CuCl (MW 99) were added to the vial. The vial was immediately sealed with a rubber septum and the mixture was stirred for 10 min under a nitrogen atmosphere. The above monomer solution was then pumped into the capillary by $N_2$ pressure. After 3 drops of the initiator solution came out of the other end of the capillary, both ends of the capillary were sealed with a silicon rubber septum. The reaction was allowed to proceed at room temperature for 4 hours. Then the capillary was rinsed with nanopure water.

Example 8

Controlled Surface Polymerization to Coat a Polyethylene Glycol Methacrylate (PEGM) on Capillary Inner Wall Surface The clean-up and initiation monolayer steps are the same as those in Example 6. In a typical polymerization reaction, an ethylene glycol methacrylate monomer solution having a 1.5 M concentration was prepared by adding 4.0 g of ethylene glycol methacrylate (MW 360) and 3.6 g of nanopure water to a 20 mL sample vial. Then, 0.0452 g of bipyridyl (MW 154), 0.0036 mg of $CUCl_2$ (MW 134.5) and 0.0134 mg CuCl (MW 99) were added to the vial. The vial was immediately sealed with a rubber septum and the mixture was stirred for 10 min under a nitrogen atmosphere. The above monomer solution was then pumped into the capillary by $N_2$ pressure. After 3 drops of the initiator solution came out of the other end of the capillary, both ends of the capillary were sealed with a silicon rubber septum. The reaction was allowed to proceed at room temperature for 4 hours. Then the capillary was rinsed with nanopure water.

Example 9

Controlled Surface Polymerization to Coat a PEGM/PAAm Copolymer Coating on Capillary Inner Wall Surface The clean-up and initiation monolayer steps are the same as those in Example 6. In a typical polymerization reaction, an ethylene glycol methacrylate monomer solution having a 1.5 M concentration was prepared by adding 4.0 g of ethylene glycol methacrylate (MW 360) and 3.6 g of nanopure water to a 20 mL sample vial. Then, 0.0452 g of bipyridyl (MW 154), 0.0036 mg of $CuCl_2$ (MW 134.5) and 0.0134 mg CuCl (MW 99) were added to the vial. The vial was immediately sealed with a rubber septum and the mixture was stirred for 10 min under a nitrogen atmosphere. The above monomer solution was then pumped into the capillary by $N_2$ pressure. After 3 drops of the initiator solution came out of the other end of the capillary, both ends of the capillary were sealed with a silicon rubber septum. The reaction was allowed to proceed at room temperature for 4 hours. Then the capillary was rinsed with nanopure water. After first block of PEGM thin film was bonded onto the capillary wall, an acrylamide monomer solution was prepared according to example 6 and was pumped into the capillary by $N_2$ pressure. After 3 drops of the initiator solution came out of the other end of the capillary, both ends of the capillary were sealed with a silicon rubber septum. The reaction was allowed to proceed at room temperature for 4 hours. Then the capillary was rinsed with nanopure water. The result of this experiment is that a block copolymer of PEGM/PAAm was grafted onto the capillary inner wall.

Example 10

Ellipsometrically Measuring the Thickness of the PEGM Film

The thickness of the initiator monolayer 5-Trichlorosilyl pentyl 2-bromo-2-methyl propionate in combination with the PEGM film grown on the surface of the silicon wafers in accordance with Example 5 was measured by a null-ellipsometer (Rudolph Auto EL-II, Fairfield, N.J.). The wavelength of the laser beam employed for the measurement was 632.8 nm, and the angle of incidence was 700. The refractive index of PEGM was estimated to be 1.54. The thickness was reported as an average of ten measurements on a given sample of film. The oxide layer ($SiO_2$) on the bare silicon wafer was determined to be 18.2 Å thick. The thickness of the PEGM film layer in combination with the initiator monolayer was obtained by subtracting the contribution of the oxide layer.

Example 11

Capillary Electrophoresis Separation

Figure 2:
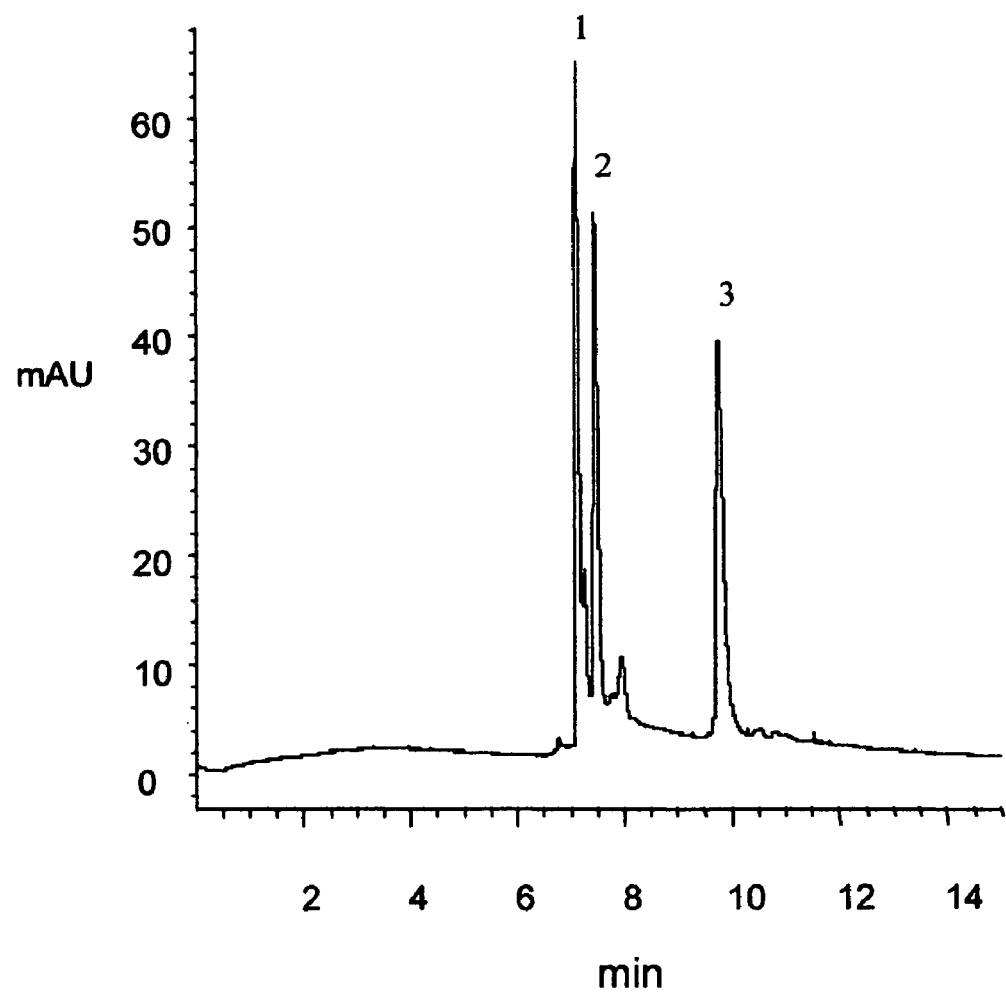

The electrophoresis was run with an Agilent 3D CE system. The capillary was cut into 50×42 cm, 75 μm (separation length is 42 cm). A 1-cm long window for detection was made by burning the capillary protection layer with either match flame or concentrated $H_2SO_4$. Samples were hydrodynamically injected under 50 mbar pressure for 1 second. The mobile phase was 50 mM sodium acetate buffer at pH 4.5. The proteins with the concentration of 0.5 mg/mL or 1 mg/mL was prepared by diluting 2.0 mg/mL stock protein solution with acetate buffer. Between runs, the column was rinsed with buffer solution. The electropherograph for PAAm and PEGM coating was recorded as shown in FIGS. 1 and 2.

What is claimed is:

1. A chemically coated surface comprising:
   (a) a support surface;
   (b) a coupling agent;
   (c) a chemical surface coating comprising at least one block copolymer prepared from addition monomers;
   wherein the coupling agent is a polymer or an oligomer comprising of:
   (i) at least two functional groups capable of binding onto the support surface;
   (ii) at least two functional groups capable of generating a living radical for initiating polymerization of addition monomers;
   and wherein the coupling agent has a hydrocarbon backbone.

2. A chemically coated surface of claim 1, wherein the support surface is silica.

3. A chemically coated surface of claim 1, wherein the coupling agent is:

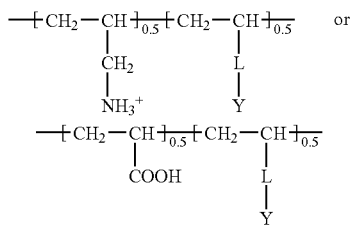

wherein L is a divalent organic moiety, Y is a functional group capable of generating a living radical for initiating polymerization of addition monomers.

4. A chemically coated surface of claim 3, wherein Y is:

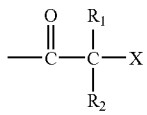

$R_1$, $R_2$ are independently selected from a group consisting of H, hydrocarbyl and substituted hydrocarbyl, X is selected from Cl, Br and I.

5. A chemically coated surface of claim 4, wherein $R_1=R_2=CH_3$, X is Cl or Br.

6. A chemically coated surface of claim 3, wherein Y is:

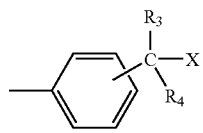

$R_3$, $R_4$ are independently selected from a group consisting of H, hydrocarbyl and substituted hydrocarbyl. X is selected from Cl, Br and I.

7. A chemically coated surface of claim 6, wherein $R_3=R_4=CH_3$, X is Cl or Br.

8. A chemically coated surface of claim 1, wherein the polymer or oligomer is prepared from acrylic acid and the following molecule:

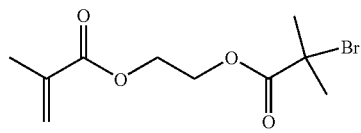

9. A chemically coated surface of claim 1, wherein the at least one block copolymer is prepared from addition monomers selected from a group consisting of acrylates and its derivatives, methacrylates and its derivatives, styrene and its derivatives, acrylamide, methacrylamide, N-monosubstituted acrylamide, N-monosubstituted methacrylamide, N,N-bissubstituted acrylamide, N,N-bissubstituted methacrylamide, vinyl acetate, vinyl pyrolidone, vinyl ether, acrylic acid, methacrylic acid.

10. A chemically coated surface of claim 9, wherein the addition monomers are selected from a group consisting of polyethylene glycol methacrylate with $(CH_2CH_2O)_n$, n=1–20, polyethylene glycol acrylate with $(CH_2CH_2O)_n$, n=1–20, glycidyl methacrylate, glycidyl acrylate, acrylamide, methacrylamide and vinyl pyrolidone.

11. A chemically coated surface of claim 10, wherein the addition monomers are selected from a group consisting of polyethylene glycol methacrylate with $(CH_2CH_2O)_n$, n=1–20, polyethylene glycol acrylate with $(CH_2CH_2O)_n$, n=1–20, acrylamide, methacrylamide.

12. A chemically coated surface of claim 1, wherein at least two block copolymers are crosslinked.

13. Capillary columns and microchannel made with the chemically coated surface of claim 1.

14. A method for making a chemically coated surface, comprising:
    (a) contacting a support surface with a coupling agent solution; then,
    (b) contacting the support surface with a first living radical polymerizing solution; and optionally
    (c) contacting the support surface with a second living radical polymerizing solution;
    wherein the coupling agent is a polymer or an oligomer comprising of:
        (i) at least two functional groups capable of binding onto the support surface;
        (ii) at least two functional groups capable of generating a living radical for initiating polymerization of addition monomers;
    and wherein the coupling agent has a hydrocarbon backbone.

15. A method for making a chemically coated surface of claim 14, wherein the polymer or oligomer is prepared from acrylic acid and the following molecule:

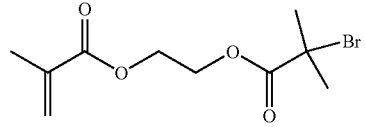

16. A method for making a chemically coated surface of claim 14, wherein the first and second living radical polymerizing solution independently comprises of at least one solvent, at least one catalyst and at least one addition monomer.

17. A method for making a chemically coated surface of claim 16, wherein the solvent is a mixture of water and water miscible organic solvent.

18. A method for making a chemically coated surface of claim 16, wherein the solvent is water.

19. A method for making a chemically coated surface of claim 16, wherein the at least one catalyst is selected from the group consisting of $MX_nE_m$, wherein M=Cu, Ni, Ru, Rh, Re or Pd; E is a ligand; X=Cl, Br or I; n=1 to 6, m=1 to 6.

20. A method for making a chemically coated surface of claim 19, wherein the at least one catalyst is selected from the group consisting of $MX_nE_m$, wherein M=is Cu; E is selected from bipyridine and its derivatives, n=1 or 2; m=2; X=Cl or Br.

21. A method for making a chemically coated surface of claim 20, wherein the catalysts are $CuCl(bipyridine)_2$ and $CuCl_2(bipyridine)_2$.

22. A method for making a chemically coated surface of claim 16, wherein the at least one addition monomer is selected from the group consisting of acrylates and its derivatives, methacrylates and its derivatives, styrene and its derivatives, acrylamide, methacrylamide, N-monosubstituted acrylamide, N-monosubstituted methacrylamide, N,N-bissubstituted acrylamide, N,N-bissubstituted methacrylamide, vinyl acetate, vinyl pyrolidone, vinyl ether, acrylic acid, methacrylic acid, diolefins, triolefins and tetraolefins.

23. A method for making a chemically coated surface of claim 22, wherein the at least one addition monomer is selected from the group consisting of polyethylene glycol methacrylate with $(CH_2CH_2O)_n$, n=1–20, polyethylene glycol acrylate with $(CH_2CH_2O)_n$, n=1–20, glycidyl methacrylate, glycidyl acrylate, acrylamide, methacrylamide and vinyl pyrolidone.

24. A method for making a chemically coated surface of claim 23, wherein the at least one addition monomer is selected from the group consisting of polyethylene glycol methacrylate with $(CH_2CH_2O)_n$, n=1–20, polyethylene glycol acrylate with $(CH_2CH_2O)_n$, n=1–20, acrylamide, methacrylamide.

25. Capillary columns and microchannel made with the chemically coated surface prepared by the process of claim 14.

26. A method for making a chemically coated surface of claim 14 wherein the support surface is inner surface of a capillary.

* * * * *